United States Patent
Blum et al.

(10) Patent No.: US 9,991,046 B2
(45) Date of Patent: Jun. 5, 2018

(54) ENERGY INTAKE APPARATUS FOR A MOTOR VEHICLE THAT CAN BE OPERATED ELECTRICALLY AND METHOD FOR OPERATING AN ENERGY INTAKE APPARATUS FOR A MOTOR VEHICLE THAT CAN BE OPERATED ELECTRICALLY

(71) Applicant: SIEMENS AKTIENGESELLSCHAFT, Munich (DE)

(72) Inventors: Manuel Blum, Ottobrunn (DE); Thomas Komma, Ottobrunn (DE); Monika Poebl, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 162 days.

(21) Appl. No.: 14/645,620

(22) Filed: Mar. 12, 2015

(65) Prior Publication Data
US 2015/0262750 A1  Sep. 17, 2015

(30) Foreign Application Priority Data
Mar. 12, 2014  (DE) .................. 10 2014 204 517

(51) Int. Cl.
*H02J 7/00* (2006.01)
*H01F 27/36* (2006.01)
(Continued)

(52) U.S. Cl.
CPC ........... *H01F 27/36* (2013.01); *B60L 11/182* (2013.01); *H01F 38/14* (2013.01); *H02J 5/005* (2013.01);
(Continued)

(58) Field of Classification Search
CPC .......... H01F 27/24; H01F 27/34; H01F 27/36; H01F 27/2804; H02J 7/025; H02J 7/0042;
(Continued)

(56) References Cited

U.S. PATENT DOCUMENTS 6,362,594 B2 * 3/2002 Kajiura ............... B60L 11/1825
320/104
2012/0242447 A1 9/2012 Ichikawa
(Continued)

FOREIGN PATENT DOCUMENTS

CN  102656648 A  9/2012
CN  102668304 A  9/2012
(Continued)

*Primary Examiner* — Minh N Tang
(74) *Attorney, Agent, or Firm* — Laurence Greenberg; Werner Stemer; Ralph Locher

(57) ABSTRACT

An energy intake apparatus for a motor vehicle can be operated electrically, with an induction coil, which is configured to charge an energy storage unit of the motor vehicle. The energy intake apparatus contains a shield apparatus, by which the induction coil can be shielded from the motor vehicle. The shield apparatus has at least one first shield component separating the induction coil from the motor vehicle in the transverse vehicle direction and/or in the longitudinal vehicle direction and at least one second shield component separating the induction coil from the motor vehicle upward in the vertical vehicle direction. The second shield component being connected to the first shield component.

13 Claims, 1 Drawing Sheet

(51) Int. Cl.
*B60L 11/18* (2006.01)
*H02J 50/70* (2016.01)
*H02J 50/10* (2016.01)
*H01F 38/14* (2006.01)
*H02J 5/00* (2016.01)
*H02J 7/02* (2016.01)

(52) U.S. Cl.
CPC ............ *H02J 7/0042* (2013.01); *H02J 7/025* (2013.01); *H02J 50/10* (2016.02); *H02J 50/70* (2016.02)

(58) Field of Classification Search
CPC ......... H02J 7/0052; B60L 11/00; B60L 11/18; B60L 11/182
See application file for complete search history.

(56) References Cited

U.S. PATENT DOCUMENTS

| | | | |
|---|---|---|---|
| 2013/0038135 A1 | 2/2013 | Ichikawa | |
| 2013/0249477 A1* | 9/2013 | Keeling | ................ H01F 27/02 320/108 |
| 2014/0346815 A1 | 11/2014 | Keutz et al. | |
| 2015/0061583 A1 | 3/2015 | Nakamura et al. | |

FOREIGN PATENT DOCUMENTS

| | | |
|---|---|---|
| DE | 102011056807 A1 | 6/2013 |
| DE | 112013001910 T5 | 12/2014 |
| WO | 2013150365 A2 | 10/2013 |

\* cited by examiner

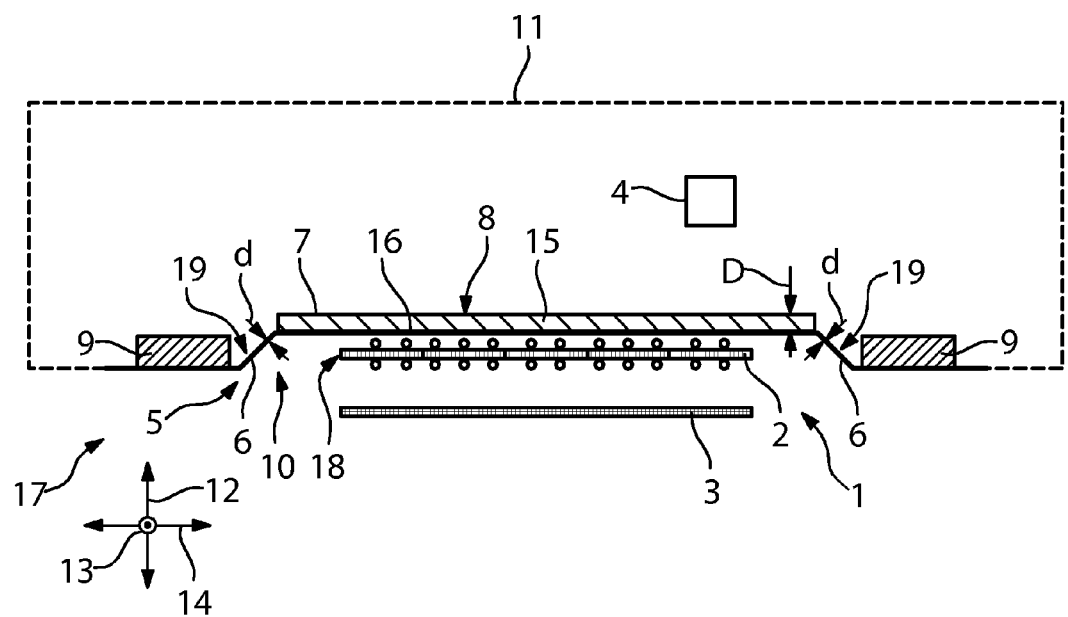

ENERGY INTAKE APPARATUS FOR A MOTOR VEHICLE THAT CAN BE OPERATED ELECTRICALLY AND METHOD FOR OPERATING AN ENERGY INTAKE APPARATUS FOR A MOTOR VEHICLE THAT CAN BE OPERATED ELECTRICALLY

CROSS-REFERENCE TO RELATED APPLICATION

This application claims the priority, under 35 U.S.C. § 119, of German application DE 10 2014 204 517.7, filed Mar. 12, 2014; the prior application is herewith incorporated by reference in its entirety.

BACKGROUND OF THE INVENTION

Field of the Invention

The invention relates to an energy intake apparatus for a motor vehicle that can be operated electrically, with an induction coil, which is configured to charge an energy storage unit of the motor vehicle. The invention also relates to a method for operating an energy intake apparatus for a motor vehicle that can be operated electrically.

With such an energy intake apparatus an induction coil (secondary coil) is subjected to an electromagnetic field by an external induction coil (primary coil). During this process an energy storage unit within the vehicle is charged by a changing magnetic field of the external induction coil. The energy storage unit can be configured for example as a so-called high-voltage battery. In contrast to refueling with fossil fuels (for example LPG, CNG, petrol or diesel), during inductive charging energy is stored contactlessly, so there is no need for monitoring by the driver or the person performing the refueling operation. Since with inductive charging, in contrast to refueling with fossil fuels, a filler opening does not have to be opened for the introduction of fuel, in contrast to refueling with fossil fuels with inductive charging there is no risk of escaping fuel vapors for example being emitted. There is therefore also no risk of explosion, so inductive charging is considered to be particularly safe. The primary coil or primary coils (external induction coils) can be installed for example in public parking lots, with a motor vehicle equipped with an induction coil being refueled while parked in such a parking lot or the energy storage unit (high-voltage battery) being charged while parked.

However losses or power losses occur during the charging operation in the secondary side of the coil system, in other words in the induction coil and during rectification of the induced AC voltage.

SUMMARY OF THE INVENTION

It is the object of the present invention to create an energy intake apparatus of the type mentioned in the introduction, with which particularly small losses occur during inductive charging and incidental power loss can be dissipated particularly efficiently.

The object is achieved by an energy intake apparatus with the features of the main apparatus claim and by a method with the features of the main method claim. Advantageous embodiments with expedient developments of the invention are set out in the dependent claims.

The inventive energy intake apparatus contains a shield apparatus, by which the induction coil can be shielded from the motor vehicle. The shield apparatus has at least one first shield component separating the induction coil from the motor vehicle in a transverse vehicle direction and/or in a longitudinal vehicle direction and at least one second shield component separating the induction coil from the motor vehicle upward in a vertical vehicle direction. The second shield component is connected to the first shield component.

The energy intake apparatus is suitable both for taking in electrical energy, in other words for charging the induction coil of the motor vehicle, and also for example for feeding electrical energy back into a supply network. During feeding back the energy storage unit (e.g. high-voltage battery) within the vehicle is at least partially discharged. Such feeding in and back is expedient for example when the energy storage unit of the motor vehicle is used as a network buffer for a power network ("vehicle-to-grid" application). In other words the energy intake apparatus can be operated bi-directionally, it being possible for energy to be both taken in and emitted. The induction coil (secondary coil) is preferably arranged on the vehicle under floor of the motor vehicle, the shield apparatus being able to limit even electromagnetic radiation occurring during inductive charging particularly locally and components within the vehicle, for example entertainment systems, therefore remaining uninfluenced to a particular degree by the inductive charging process and therefore not being affected by electromagnetic radiation. The shield apparatus therefore ensures particularly good electromagnetic compatibility (EMC). During inductive charging an external induction coil is generally brought up to the induction coil or aligned relative to the induction coil in order to achieve a particularly high charging efficiency and therefore particularly small losses or a particular small power loss. In order to achieve this, the shield apparatus is used to shield the components of the motor vehicle or the metal and ferromagnetic components from the magnetic field (of the induction coil) for the energy transfer.

The induction coil is shielded laterally or toward the sides of the induction coil by the first shield component. In other words the first shield component is arranged between the motor vehicle and the induction coil of the motor vehicle. Depending on how vehicle components to be shielded, for example entertainment systems or radiation-sensitive control devices, are arranged relative to the induction coil, the first shield component can form a frame around the induction coil and therefore enclose it in the transverse vehicle direction, in the longitudinal vehicle direction and at least partially also in the vertical vehicle direction. It is clear that for example a number of components, in other words a number of first shield components, can form this (optionally closed) frame. However if the induction coil is arranged for example at one end of the motor vehicle (for example in direct proximity to the bumper), shielding in the direction of the end of the motor vehicle (for example toward the bumper) could optionally be dispensed with, it being possible for the first shield component then only to enclose the induction coil in a U shape. It would then be possible to dispense with separation or shielding at least partially, if this is not expected to result in electromagnetic interference. The first shield component can therefore be configured in a particularly flexible manner in respect of electromagnetic compatibility requirements and can therefore also only encircle the induction coil partially or separate it from the motor vehicle and shield it from other components of the motor vehicle partially.

The second shield component is arranged between the induction coil and the motor vehicle like the first shield component can be configured as a component of the vehicle under floor or the under floor protection of the motor vehicle. The first shield component can therefore be connected to the second shield component and together with it can form a trough or recess, in which the induction coil is inserted, the induction coil then being able to be aligned so that it is flush with the remainder of the vehicle under floor, in other words for example flush with a crash frame of the motor vehicle adjoining the first shield component. The induction coil is then therefore countersunk upward in the vertical vehicle direction and does not project down from the vehicle under floor in the vertical vehicle direction. The induction coil is therefore protected particularly effectively from mechanical damage for example due to flying stones or branches and from detachment of the induction coil as a result of the motor vehicle under floor coming into contact with the road surface or an object on the road surface.

In order to achieve optimum field guidance, the first shield component and the second shield component together form a shield plate, by which during inductive charging the field lines are guided in a funnel shape to the cross-sectional surface (which extends in the vertical or transverse vehicle direction) of the (secondary-side) solenoid of the induction coil.

In one advantageous embodiment of the invention the at least one first shield component has side parts that taper in a V shape upward in the vertical vehicle direction.

The V-shaped arrangement of the side parts of the first shield component or the respective opposing side parts, which are part of the first shield component or adjoin the second shield component at an obtuse angle thereto, allows the secondary side of the coil system, in other words the induction coil, to be integrated in the vehicle under floor in such a manner that the induction coil is completely countersunk in the vehicle under floor. The V-shaped taper means that the side parts form an obtuse angle with the second shield component.

This V shape also results in optimum field guidance with particular little loss or particularly little power loss during inductive charging.

In a further advantageous embodiment of the invention the at least one second shield component has a thicker wall thickness than the at least one first shield component, at least in parts.

The induction coil covers (upward in the vertical vehicle direction) a particularly large region of the second shield component, with the induction coil either resting against the second shield component or being separated from it by a gap. Because the second shield component is configured as a shield plate that is thicker in parts and is made for example of copper, eddy currents form during the inductive charging operation, which counteract the exciter field, shaping it as a result and therefore preventing surrounding components heating up.

It has also proved advantageous for the second shield component to have a cooling region for dissipating heat from the induction coil.

In order to dissipate power loss that occurs in the form of heat at the secondary coil, the second shield component has a cooling region on the partially thicker shield plate. Heat is spread on this cooling region. The surface enlargement resulting from the spread of heat allows a correspondingly more effective loss dissipation. Surface enlargement can be increased by treating the shield surface (for example by sandblasting). If the shield surface is not treated, the cooling region, or the region of the thickened shield plate, or the second shield component, can be brought into direct contact with a medium with good thermal conductivity for heat dissipation. In other words the cooling region, or the thickened shield plate can therefore adjoin for example a cooling component provided with cooling ribs, its material or medium corresponding for example to a metal with particularly high thermal conductivity. This ensures particularly efficient heat dissipation. This medium with good thermal conductivity could adjoin the second shield component for example upward in the vertical vehicle direction and have an air stream flowing around it for better heat dissipation.

It is also particularly advantageous if a cooling medium can flow through at least part of the cooling region.

In order to achieve a particularly good cooling performance, in addition or as an alternative to heat dissipation to the surroundings, a cooling medium can also be conveyed through the cooling region by forced or free convection and the cooling region can therefore be configured for example as a water-cooled heat exchanger.

It has also proved advantageous for the shield apparatus to be formed at least partially from aluminum.

Aluminum has the advantage of both particularly good heat conductivity and particularly low density. Aluminum is therefore not only ideally suited to dissipating heat resulting from power loss but it also helps to reduce vehicle weight.

With the inventive method for operating an energy intake apparatus for a motor vehicle that can be operated electrically, which contains an induction coil, which is configured to charge an energy storage unit of the motor vehicle, the energy intake apparatus contains a shield apparatus, by which the induction coil is shielded from the motor vehicle.

The shield apparatus contains at least one first shield component, which separates the induction coil from the motor vehicle in the transverse vehicle direction and/or in the longitudinal vehicle direction and shields the motor vehicle from an electromagnetic field. The shield apparatus further has at least one second shield component connected to the first shield component and separating the induction coil from the motor vehicle upward in the vertical vehicle direction and shielding the motor vehicle from the electromagnetic field.

With this method particularly small losses or power losses result during inductive charging, these being emitted particularly efficiently to the surroundings in the form of heat.

Other features which are considered as characteristic for the invention are set forth in the appended claims.

Although the invention is illustrated and described herein as embodied in a energy intake apparatus for a motor vehicle that can be operated electrically and a method for operating an energy intake apparatus for a motor vehicle that can be operated electrically, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, sectional view of an energy intake apparatus of a motor vehicle having an induction coil (secondary coil) according to the invention.

DETAILED DESCRIPTION OF THE INVENTION

Referring now to the single FIGURE of the drawing in detail, there is shown an energy intake apparatus 1 for a motor vehicle 11 that can be operated electrically, in the present instance only shown schematically by a broken line. The energy intake apparatus 1 contains an induction coil 2, which can be subjected to an electromagnetic field by an external induction coil 3 in order to charge an energy storage unit 4 of the motor vehicle 11. The energy storage unit 4 is configured for example as a so-called high-voltage battery, which is coupled to the induction coil 2 in such a manner that energy can be transferred. The coupling between the energy storage unit 4 and the induction coil 2 is not shown in detail in the present instance. The induction coil 2, also referred to as the secondary coil, is arranged in an holding region 10, which is formed by a shield apparatus 5 consisting of a first shield component 6 and a second shield component 7, arranged on or under floor 17 of the motor vehicle 11.

The shield apparatus 5 containing the first shield component 6 and the second shield component 7 is configured as a shield plate, in which the induction coil 2 is countersunk upward in the vertical vehicle direction 12. The induction coil 2 is therefore arranged at least flush with the vehicle under floor 17 or with a crash frame 9 of the vehicle under floor 17. However the induction coil 2 is preferably located lower than the crash frame 9 upward in the vertical vehicle direction 12. The crash frame 9 is particularly resistant to mechanical deformation and can enclose both the shield apparatus 5 and the induction coil 2 held in the holding region 10 of the shield apparatus 5 in a rectangular manner for example, with the result that the induction coil 2 is particularly effectively protected against mechanical deformation or damage.

The first shield component 6 of the shield apparatus 5 separates the induction coil 2 from the motor vehicle 11 in the transverse vehicle direction 13 and additionally or alternatively in the longitudinal vehicle direction 14. As shown in this sectional view, respective opposing side parts 19 of the first shield component 6 form a V shape. In other words the respective side parts 19 form an angle in their notional extension upward in the vertical vehicle direction 12 and are therefore not parallel to one another. In other words the individual side parts 19 therefore form an obtuse angle with the second shield component 7

As mentioned above, the first shield component 6 and the second shield component 7 form the shield apparatus 5 in the trough-shaped holding region 10, in which the induction coil 2 is held. The shield apparatus 5 allows the induction coil 2 on a side 16 of the second shield component 7 facing away from the external induction coil 3 to be shielded from the motor vehicle 11. The shield apparatus 5, in other words the shield plate, is shaped in such a manner that any field lines are guided in a funnel shape to a cross-sectional surface 18 of the secondary-side solenoid of the induction coil 2. This allows particularly high efficiency to be achieved during inductive charging by the external induction coil 3.

The second shield component 7 in the present instance has a thicker wall thickness D than the first shield component 6, the wall thickness of which corresponds to d. The second shield component 7 also has a cooling region 8 for dissipating heat from the induction coil 2. Because the shield plate (shield apparatus 5) has a particularly thick wall thickness D in the region of the second shield component 7, eddy currents can form during inductive charging, which counteract the exciter field, shaping it as a result and therefore preventing surrounding parts or components of the motor vehicle 11 from heating up. In a preferred embodiment the shield apparatus 5 is formed at least partially from aluminum, thereby allowing considerable weight savings to be achieved. The first shield component 6 or the side parts 19 of the first shield component 6 arranged in a V shape primarily have the object of guiding the magnetic field in a funnel shape and shielding respective vehicle components, which are located above the vehicle under floor 17 or above the shield apparatus 5 in the vertical vehicle direction 12. In order to achieve this object, it is sufficient for the wall thickness d of the side parts 19 to be thinner than the wall thickness D of the second shield component 7. Because the wall thickness d of the side parts 19 can be configured as particularly thin, it is possible to reduce vehicle weight and thus save on the energy required to move the motor vehicle 11.

The second shield component 7 or its cooling region 8 (wall thickness D) has both the object of shielding the metal and ferromagnetic parts or components located in the vicinity of the vehicle under floor 17 from the magnetic field during inductive charging and also the object of dissipating heat resulting from losses or power losses during inductive charging. Because the wall thickness D is thicker than the wall thickness d, the cooling region 8 of the second shield component 7 in particular can be used to spread heat. The surface enlargement resulting from the spread of heat allows more effective heat or loss dissipation by the cooling region 8 of the second shield component 7. The cooling region 8 here can not only be formed completely from aluminum, which serves as a cooling medium 15, but can also have a liquid cooling medium 15 flowing through it. The cooling region 8 could therefore be configured for example as a heat exchanger with cooling water flowing through it.

The invention claimed is:

1. An energy intake apparatus for a motor vehicle being operated electrically, the energy intake apparatus comprising:
    an induction coil configured to charge an energy storage unit of the motor vehicle; and
    a shield for shielding said induction coil from the motor vehicle, said shield having a first shield component separating said induction coil from the motor vehicle in at least one of a transverse vehicle direction or a longitudinal vehicle direction and a second shield component separating said induction coil from the motor vehicle upward in a vertical vehicle direction, said second shield component being connected to said first shield component;
    said second shield component having a thicker wall thickness than said first shield component for forming eddy currents counteracting an exciter field during inductive charging and thereby preventing surrounding parts or components of the motor vehicle from heating up.

2. The energy intake apparatus according to claim 1, wherein said second shield component has a cooling region for dissipating heat from said induction coil.

3. The energy intake apparatus according to claim 2, further comprising a cooling medium flowing through at least part of said cooling region.

4. The energy intake apparatus according to claim 3, wherein the cooling medium is water.

5. The energy intake apparatus according to claim 1, wherein said shield is formed at least partially from aluminum.

6. The energy intake apparatus according to claim 1, wherein said first shield component has opposite side parts that extend inwardly as the opposite side parts extend upward in the vertical vehicle direction, and wherein a distance between said opposite side parts tapers as said opposite side parts extend upward in the vertical vehicle direction.

7. The energy intake apparatus according to claim 6, wherein said induction coil is spaced away from the opposite side parts of said first shield component.

8. The energy intake apparatus according to claim 1, further comprising cooling ribs adjoining the second shield component.

9. A method for operating an energy intake apparatus for a motor vehicle that is operated electrically, the energy intake apparatus having an induction coil configured to charge an energy storage unit of the motor vehicle, which comprises the steps of:

provided the energy intake apparatus with a shield for shielding the induction coil from the motor vehicle, the shield having a first shield component separating the induction coil from the motor vehicle in at least one of a transverse vehicle direction or a longitudinal vehicle direction and shielding the motor vehicle from an electromagnetic field, and the shield having a second shield component connected to the first shield component and separating the induction coil from the motor vehicle upward in a vertical vehicle direction and shielding the motor vehicle from the electromagnetic field; and preventing surrounding parts or components of the motor vehicle from heating up by forming eddy currents counteracting an exciter field during inductive charging, and forming the eddy currents by providing the second shield component with a thicker wall thickness than the first shield component.

10. The method according to claim 9, wherein the first shield component has opposite side parts that extend inwardly as the opposite side parts extend upward in the vertical vehicle direction, wherein a distance between the opposite side parts tapers as the opposite side parts extend upward in the vertical vehicle direction.

11. The method according to claim 10, wherein the induction coil is spaced away from the opposite side parts of the first shield component.

12. The method according to claim 9, further comprising providing a cooling medium flowing through at least part of a cooling region of said second shield component, wherein the cooling medium is water.

13. The method according to claim 9, further comprising providing cooling ribs adjoining the second shield component.

* * * * *